Nov. 30, 1926. 1,608,831
C. F. BALL
AUTOMATIC CONTROL MECHANISM
Filed Feb. 9, 1926 5 Sheets-Sheet 1
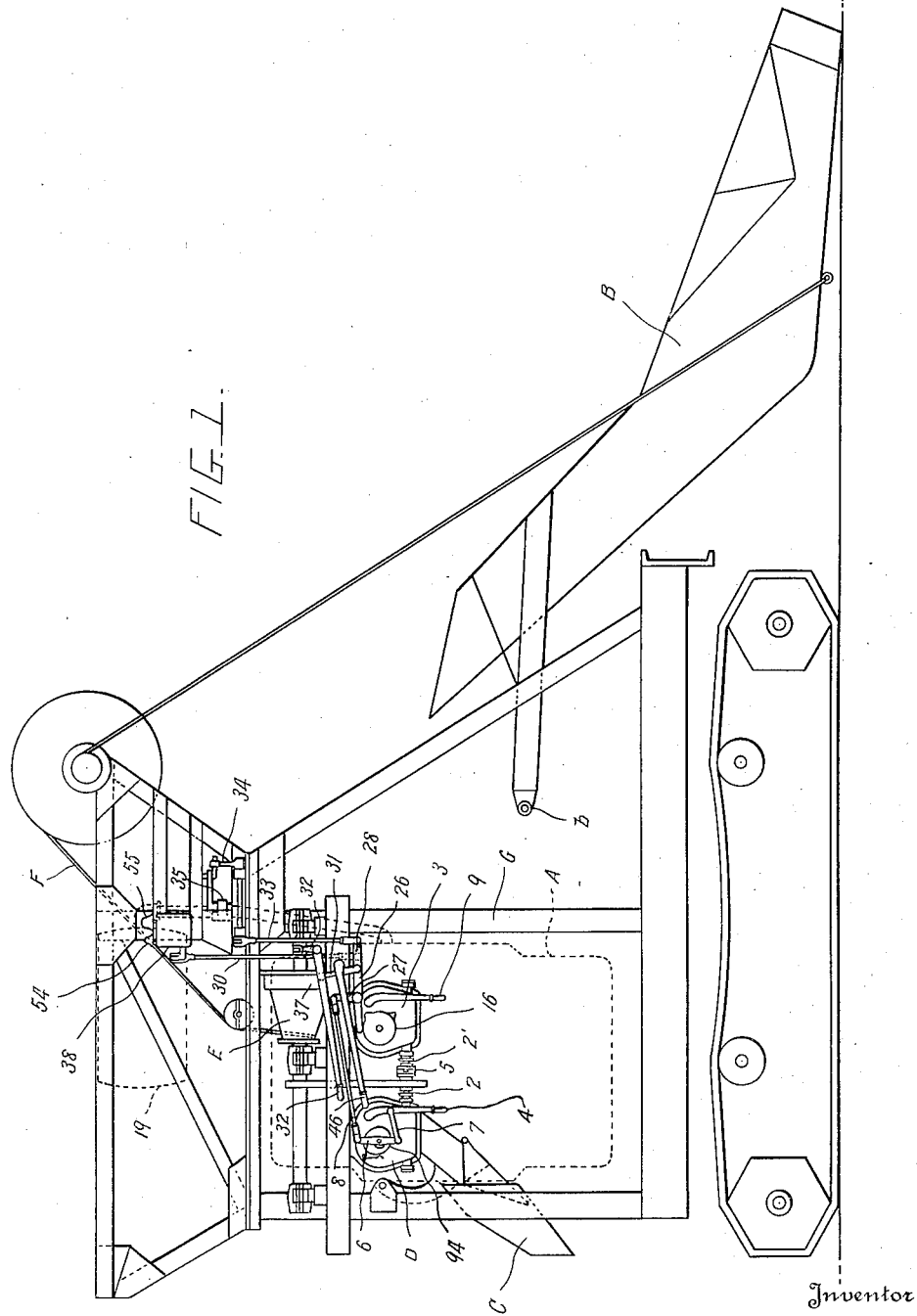
Inventor
Charles F. Ball
By John S. Barker
Attorney

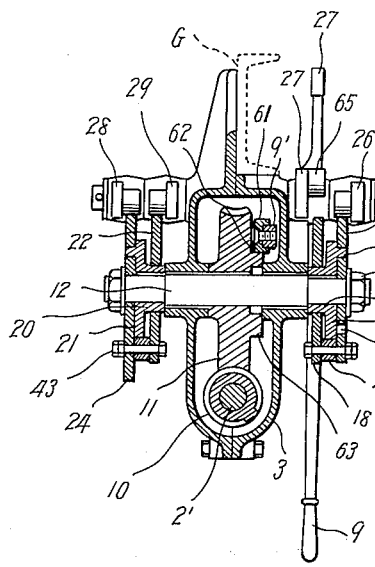

Nov. 30, 1926.
C. F. BALL
1,608,831
AUTOMATIC CONTROL MECHANISM
Filed Feb. 9, 1926   5 Sheets-Sheet 3
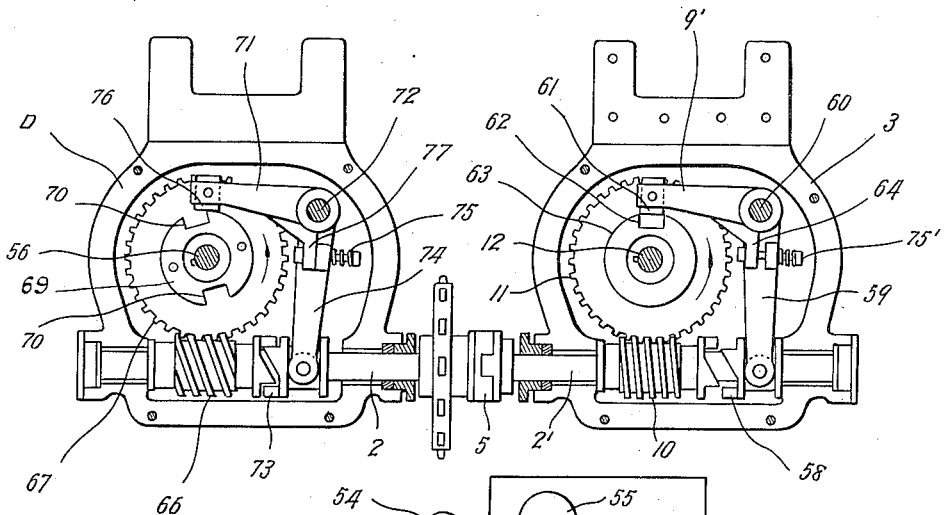

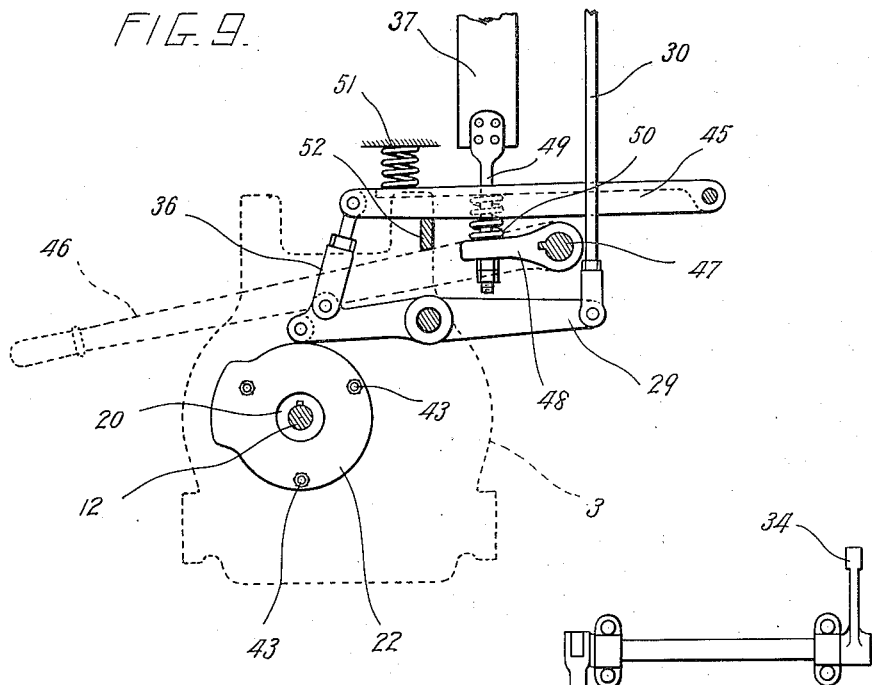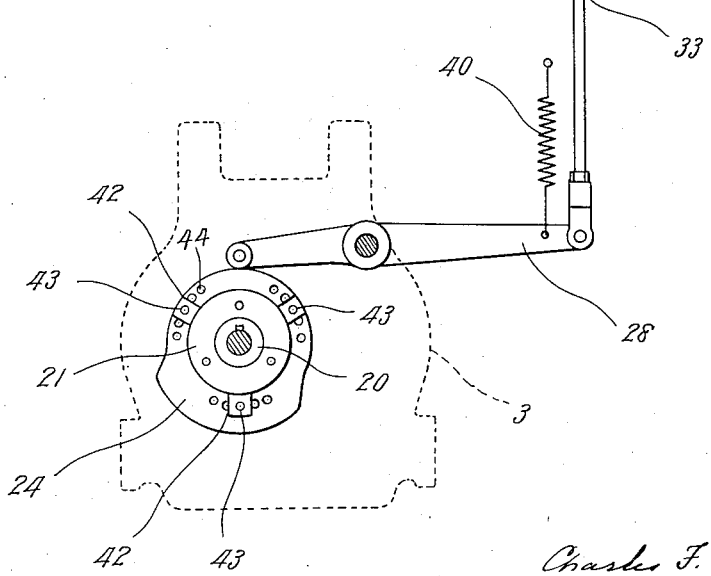

Patented Nov. 30, 1926.

1,608,831

UNITED STATES PATENT OFFICE.

CHARLES F. BALL, OF MILWAUKEE, WISCONSIN, ASSIGNOR TO CHAIN BELT COMPANY, OF MILWAUKEE, WISCONSIN, A CORPORATION OF WISCONSIN.

AUTOMATIC CONTROL MECHANISM.

Application filed February 9, 1926. Serial No. 87,104.

My invention relates to novel control mechanism which, while being especially designed for use in connection with concrete mixing apparatus, is also adapted, in whole or in part, to be used in connection with other apparatus of more or less kindred nature.

It is well known that the restrictions placed upon the mixing of concrete for industrial purposes, by building regulations, contracts, and otherwise, make it increasingly important that the operations of the apparatus shall be automatically controlled, in order that the requisite time shall be given to the various operations performed, and that these shall take place in proper sequence. Good management requires that certain different movements and operations of a concrete mixing apparatus shall take place simultaneously, in order that the apparatus shall perform at its maximum efficiency. Thus, while the discharge from the mixing drum should not take place at the same time that the drum is being charged, it is entirely practicable, and indeed is good practice, to start the elevating of the loading skip with a charge of aggregates for the mixer while the discharge chute is still in position and delivering the previously mixed charge of concrete; so that the time required to charge, mix and discharge a given batch is considerably shorter than it would be if each of these three operations took place separately and in sequence.

In the use of concrete mixing apparatus it is very desirable that certain of the operations shall be maintained under manual control, even though an automatic control device be also employed. Thus, for instance, the means by which the starting of the discharge device are controlled, the means by which the starting of the charging device are controlled, and the means by which the lowering of the charging device, when that is a ponderous loading skip such as is commonly employed in concrete mixing machines, are controlled, should all be under manual control; and my invention has been designed so as to retain these manual controls even though certain of the operations of the parts are further controlled by automatic mechanism.

My invention, therefore, has for its object to produce an automatically operating centralized control mechanism for concrete mixing and other apparatus, that is of a very simple design and construction, is capable of easy adjustment that the timing of the various operations may be accurately determined and controlled, that will insure that each operation shall be started and finished as desired, with the proper interval of time between these limits, and that, while performing its several operations as will be described shall not interfere with the manual control of certain of the parts, which manual control it is desirable to maintain.

In the accompanying drawings—

Figure 1 is a side view, largely diagrammatic, of a concrete mixing apparatus to which my invention is applied.

Fig. 2 is a side view of the control mechanism, the face or cover of the box in which it is mounted being removed to expose the parts within.

Fig. 3 is a transverse sectional view on the line III—III of Fig. 2.

Fig. 4 is a diagram illustrating the sequence of operations of the control mechanism and the relative time of each.

Fig. 5 is a face view of the driving connections and the means for operating the clutches included in such connections, between the power shaft or shafts and the mechanism that operates the automatic control.

Fig. 8 is a face view of the cam controlling the operation of the water valves and the parts immediately associated therewith.

Fig. 9 is a face view of the cam that controls the operation of the batch timer and also the release of the brake that governs the descent of the power loader and the parts immediately associated therewith.

Figure 6:
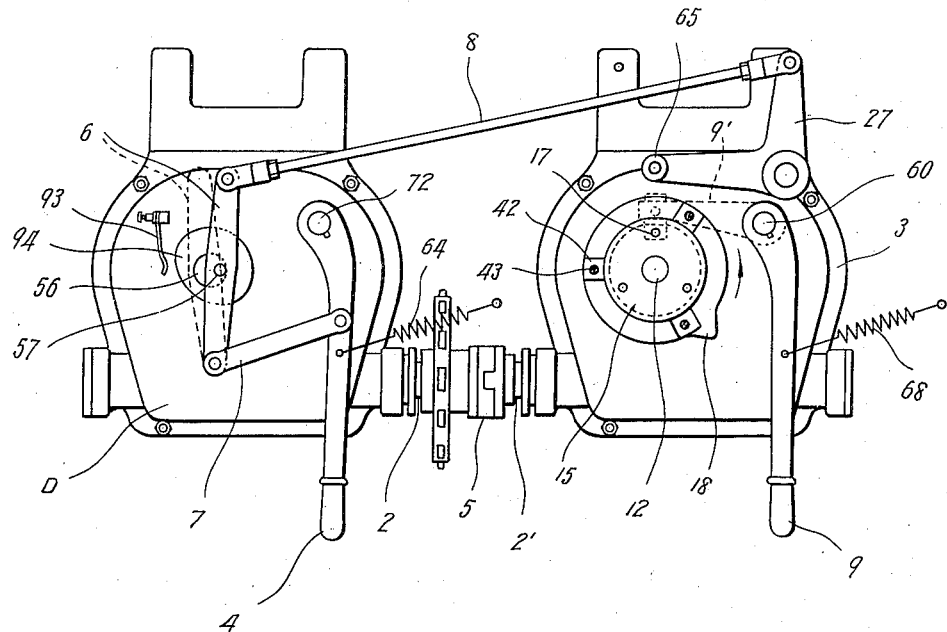
Fig. 6 is a face view of the manually operated levers controlling the clutches shown in Fig. 5 and parts directly associated therewith, some of the mechanism illustrated being in section.

Fig. 10 is a diagrammatic view illustrating the batch timer and the signals which it controls, and also illustrating the automatic control that signifies should the discharge chute be moved to delivery position before a sufficient time has elapsed for properly mixing the batch of concrete which may be then within the mixing drum, and also stops the entire apparatus should attempt be made to prematurely deliver a batch of concrete.

Many of the parts of an apparatus such as is indicated in Fig. 1 are not shown, the drawing being largely diagrammatic, and merely for the purpose of illustrating my invention, and not intended to be followed as a working drawing, as many of the connections that are indicated are capable of wide modification to suit the particular machine to which my invention may be applied.

In the drawings, A indicates a rotary mixing drum of a concrete mixing apparatus, B the loading skip in which the dry aggregates are placed and by which they are delivered into the drum. C is the discharge chute through which the mixed concrete is delivered from the apparatus. The discharge chute is represented as being of the power driven type, now in common use, and the mechanism for controlling the movements of such delivery are mounted within a casing D. Such mechanism may be like that illustrated in Patent 1,415,411, of May 9, 1922 to Samuel Shafer, Jr.

E indicates a hoisting drum upon which is wound a cable F employed to control the elevation and tilting of the loading skip about its pivot $b$.

A shaft 2, suitably geared so as to turn whenever the mixing apparatus is in operation, enters the casing D for the power discharge mechanism and operates the latter. Upon this shaft is loosely mounted a worm 66 in mesh with a worm wheel 67 supported upon the shaft 56 so as to turn therewith. The shaft 56 is the one from which the discharge chute C is operated, as explained in the aforesaid patent. A cam or collar 69, in the periphery of which are formed two diametrically opposite recesses 70, is also supported upon the shaft 56 so as to turn therewith. A clutch 73 is employed to connect the worm 66 with the shaft 2 and thus put into driving connection with the latter the mechanism that operates the discharge chute.

4 represents a hand lever which is the exposed control element of the power discharge mechanism within the casing D. It is supported upon a shaft 72 mounted in the casing, and through it the clutch 73 is controlled. Upon the shaft 72 is supported a bell crank lever formed of two parts, 71 and 74, the latter, which is loose on the shaft 72, serving as the arm for operating the movable element of the clutch 73, and the former, which is fast on the shaft, being provided with a finger or projection 76 bearing upon the periphery of the cam or collar 69, and of a shape and size to enter the recesses 70 when they come opposite to said finger. The two arms, 71 and 74, of the bell crank lever are provided with projections 77 adapted to engage with each other when the lever is moved in the direction of the arrow $a$ in Fig. 5. A spring 75 tends to move the lever so that their parts 77 are in engagement, but allows a relative movement of the arms of the lever should the teeth of the clutch be standing opposite each other at the moment the clutch lever is shifted.

It will be understood that normally the parts described occupy a position with the finger 76 of the arm 71 of the bell crank clutch shifting lever in one of the recesses 70, and the members of the clutch 73 disengaged so that no motion is being imparted to the discharge chute. These relations of the parts that have been described may maintain either with the discharge chute in its non-discharging position, as when the materials within the drum A are being mixed, when the finger 76 is in one of the recesses 70, or else with the discharge chute in position to deliver material from the drum, when the finger 76 is in the other recess 70.

3 represents a casing in which the driving mechanism of the centralized power control mechanism is located. This casing is supported upon the framework G of the mixing apparatus at some convenient point, preferably on the same side of the apparatus as is the casing D, and in proximity to the latter, so that a shaft 2', which is united with the shaft 2 by a coupling 5, and is a practical prolongation of such shaft, may enter the casing 3. The mechanism within the casing 3 is in many respects similar to that within the casing D. Thus, upon the shaft 2' is a worm 10 in mesh with a worm wheel 11 secured to a shaft 12 supported in bearings formed therefor in the side walls of the casing 3. Upon the shaft 12 is a collar 63 in which is formed a single notch 62 adapted to receive a finger or projection 61 extending laterally from a two-part bell crank lever 59 that operates a clutch 58 through which the shaft 2' is put into driving connection with the shaft 12 of the automatic control mechanism. As stated, there is but a single recess 62 in the cam or control collar 63 instead of two such recesses, as in the corresponding part 69 within the casing D, because the shaft 12 being once started makes a complete rotation of the shaft for the automatic control mechanism, whereas the shaft 68 of the mechanism that operates the discharge chute makes but a half revolution for each operation of the clutch 73.

The automatic control mechanism which is illustrated in the drawings and which I shall later describe, is arranged when once started to control the movements of various parts of a concrete mixing apparatus, as follows:

The starting of the mechanism that lifts the loading skip into position to discharge its load into the mixing drum; the turning on of the water used in the mixing of the concrete; the starting of the power mechanism that moves the discharge chute to its non-discharging position; the starting of the batch timer; the release of the brake that holds the loading skip in its elevated position; and the turning off of the water. The mechanism of my invention is adapted to control a greater number of operations than these, or a less number of operations, or different operations, but those recited are such as the mechanism illustrated is intended to control, and these are the essentially important operations that can be safely and advantageously controlled by an automatic device for concrete mixing apparatus.

The clutch 58 of the automatic centralized power control mechanism is adapted to be manually operated through a hand lever 9 secured fast to a shaft 60 on which is also supported the clutch shifting lever 59. The two hand levers, 4 and 9, are preferably similar to each other and are similarly related respectively to the two casings D and 3, and are situated at such distance apart that they may be conveniently grasped simultaneously for operation by the attendant controlling the operation of the machine.

The shaft 12 extends in either direction beyond the side walls of the casing 3 and carries on its projecting ends certain cams which, through suitable linkage or connections operate various devices of the concrete mixing apparatus in proper sequence as the shaft 12 makes a complete revolution, as will be described.

As represented, the shaft 12 carries two hubs, 14 and 20, one at each side of the casing 3, which are secured to the shaft so as to turn therewith. Each hub is formed with or carries an annular plate, these being designated, respectively, 15 and 21. The hub 14 and its plate 15, which are located at the outer end of the shaft in the arrangement illustrated in the drawings, carries a pair of cams or cam plates, 16 and 18, which are preferably separable from the hub and plate and are adjustable, relatively both to the shaft 12 and to each other.

The plate 15 is provided with a driving pin 17, or preferably with a plurality of these, three being shown. These pins are adapted to enter holes 41 formed in the outer cam plate 16, there being a series of these holes concentrically disposed relative to the shaft 12. This arrangement provides for the driving of the cam plate 16 and also permits of its angular adjustment about the shaft 12, thus permitting the position of the peripheral projection of the plate constituting the outer cam to have one position or another, as may be desired, with reference to the shaft. The apparatus that is represented in the drawings, devised for use in connection with a concrete paving machine, is intended to require thirty seconds for a complete rotation of the shaft 12, and cycle of movements of the control apparatus, when the drum of the mixer is being turned at normal speed. In such an arrangement if there be thirty holes 41 the shifting of the plate 16 so that a driving pin 17 occupies a hole next in advance, then the cam projection of the plate will come to operating position one second earlier than it did when in its former position, whereas, if it be shifted to the next hole to the rear it will come to operating position one second later.

The cam plate 18 is supported upon the hub 14 to the rear of the driving plate 15 and is maintained properly spaced from the front cam plate 16 by blocks 42. Bolts 43 pass through the plate 18, spacer blocks 42 and the plate 16 uniting these parts and causing them to turn together. In order that there may be adjustment of the operating projections of the cam plates 16 and 18, relative to each other, I form series of holes 44 for the bolts 43 in the cam plate 16.

There are two cam plates, 22 and 24, at the inner end of the shaft 12. They are adjustably supported by the hub 20 and the driving plate 21 in the same manner as are the cam plates 16 and 18 on the front end of the shaft.

The cam 16, which is the outside cam of the series carried by the shaft 12, controls the clutch for the hoisting drum B of the skip. It is arranged to act upon a lever 26, Fig. 7, one end of which carries a roller located in the plane of movement of the cam so as to be acted upon by the peripheral projection of the latter. The other end of the lever 26 is connected through linkage 31 with the lever 32 that operates to shift the clutch of the hoisting drum B.

The cam 18 controls the power discharge operating mechanism, see Fig. 6, that is to say, it controls this mechanism in such manner as to cause the discharge chute to be automatically moved to non-discharging position at the proper time. It will be understood as will be more particularly pointed out, that the mechanism for operating the power discharge chute to cause it to assume the discharging position, is manually controlled.

27 indicates a lever at one end of which is a roller 65 located in the path of the cam 18 so as to be operated thereby. The other end of this lever is connected by a link 8, a lever 6, and another link 7, with the manual control lever 4 of the power discharge operating mechanism. The lever 6 is supported upon an eccentric projection 57 of the shaft 56.

In Fig. 6 the parts of the power discharge operating mechanism are represented as being in the positions they occupy when the discharge chute C is in its non-discharging position—the position it occupies while the concrete is being mixed within the drum, the eccentric support 57 for the lever 6 being to the right, with the result that the upper end of the bell crank lever 27 is shifted to the right and the roller 65 is lifted so as to be above or beyond the path of the cam projection 18. It follows from this that when the discharge chute is in its non-discharging position the operative connection of such chute with the automatic control is broken. When, however, the shaft 56 makes a half revolution, bringing the chute C to its discharging position and carrying the eccentric 57 to its extreme position to the left, the lever 6 will assume the position shown in dotted lines in Fig. 6, and this will cause the lever 27 to drop into position to be operated upon by the cam 18, and when this occurs the lever will be lifted to about the position shown in full lines in Fig. 5, which will, through the link 8, rock the lever 6, and this in turn, through the link 7, will move the lever 4 toward the left, causing the clutch to be shifted to position to connect the power discharge mechanism with the shaft 2; and this in turn will cause the shaft 56 to be driven a half revolution, or until one of the recesses 70 comes opposite to the finger 76 of the bell crank clutch shifting lever, whereupon that will enter the recess, allowing the clutch to be shifted under the force of the spring 64 which is connected with the hand lever 4, and the connection with the power shaft 6 will be broken, bringing the parts of the power discharge to rest with the chute in non-discharging position.

From this description, taken in connection with the drawings, it will be seen that whenever the cam 18 passes the roller 65 at the end of the bell crank lever 27, it will operate the same, provided the chute C occupies its discharging position, causing its return to the non-discharging position. But if the chute happens to occupy the non-discharging position the cam will pass the roller 65 without engaging therewith or imparting any movement to the lever 27. Thus it will be seen that the cam 18 only operates to cause the discharge chute to be moved from its discharging to non-discharging position. If the discharge chute is in the latter position the control mechanism does not function.

The cam 22, toward the inner end of the shaft 12, is the control for starting the batch timer and for releasing the loading skip from the brake which operates to hold it in elevated position.

29 indicates a lever one end of which is located in the path of the cam 22 and the other end of which is connected through linkage 30 with the batch timer 38. The latter will be later described more in detail. Suffice it here to say it is a timing device of any suitable construction which is adapted, when set into motion, to operate for that period of time which may be determined upon as proper for the mixing of the material in the drum A, and which when such time has elapsed will give a signal and come to rest.

37 indicates a brake band encircling a drum connected with the hoisting drum E and controlling the movements of the latter. To the free end of the brake band is secured a bolt 49 that is connected with a short arm 48 extending out from a shaft 47, to the other end of which is secured the hand operated brake control lever 46. 45 is a lever that is connected by a link 36 with the rocking lever 29 that is actuated by the cam 22. The lever 45 is so disposed that the bolt 49 passes through an opening in the lever formed between its fulcrum and the connection of the link 36 therewith. A spring 50 is interposed between the lever 45 and the arm 48, while another spring 51 acts upon the lever 45 near its outer end, the latter spring having force enough to overcome the force of the spring 50 and hold the lever 45 against a stop 52, and at the same time operate to hold the outer or free end of the rocking lever 29 against the periphery of the cam 22.

It will be understood from the foregoing that when the drum E is turned to wind the cable thereon for lifting the skip B the brake 37 is inactive, not interfering with the free movement of the drum. When, however, the drum tends to move in the opposite direction to allow the skip to descend the brake becomes effective and is powerful enough to hold the skip in its raised position, it being desirable that the skip, having been moved to its highest position, should be there maintained for a short space of time, or, as the custom is, jiggled back and forth so as to cause all of the material of its charge to slide into the drum. The skillful manipulation of the brake and the clutch of the skip lifting mechanism by the use of the manual levers 46 and 32, enables these short movements to be imparted to the skip while it is elevated, and they take place before the cam 22 comes into operation. As soon, however, as these levers are released the brake becomes effective until automatically released through the action of the cam 22. When the projection of this cam acts upon the lever 26 it starts the batch timer and simultaneously moves the lever 45 against the action of the spring 51, releasing the brake and allowing the skip to descend. The apparatus might be provided with automatic means for controlling the speed at which the skip descends, but I have found that it is much safer and more satisfactory to control the descent of the skip manually, for which purpose I use the manually operated control lever 46. This, as may be readily seen from the drawings and the description of parts already given, may be operated to apply the brake with the required degree of pressure, notwithstanding the fact that the cam 22 may be holding the lever 45 in such position that the brake is entirely free from the action of such lever and the spring 51. It will be seen that the projecting portion of the cam 22 has a long dwell as compared with the cams 16 and 18 which have been described, and this is for the reason that it is desirable that the lever 29 should be acted upon for a period sufficiently long to allow the skip to descend under proper manual control. The cam 22 is used to perform two operations, the starting of the batch timer and the release of the skip brake, since it is desirable that they should take place simultaneously.

The cam 24 is the one which controls the water valves. Its projecting portion has the longest dwell of any of the cams used in the arrangement being described, because it is arranged to hold the valves open sufficiently long to permit the desired flow of water. The water for each batch of concrete being mixed is taken from a tank 19, suitable measuring devices, not shown herein, being provided to insure that the proper quantity of water shall be delivered for each batch of concrete. The cam 24 acts upon a lever 28 that is connected by linkage 33 with the lever 34 that serves to operate the water valves, one of which is indicated at 35. A spring 40 acting on the lever 28, may be employed to maintain the free end of the lever in engagement with the cam and also operate to automatically close the valves when the projection of the cam passes the free end of the lever.

The batch timer 38 consists of a clock mechanism 53 set into operation from the cam 22 through the linkage 30, as has been described. The clock mechanism is arranged to drive a shaft 78 one revolution, and then come to rest. Upon the shaft is mounted a finger or contact maker 79 and a cam 80. The contact maker 79 is arranged, in the course of its revolution, to engage with the contacts 81, 82 and 83, momentarily closing an electric circuit as each contact is made. The contact making finger 79 is the movable terminal of an electric circuit 84, including a battery 85 or other source of electric energy, and two electric signals 54 and 55, which are in parallel, the other terminal of the circuit, which is normally an open circuit, being either the contact 82 which is connected with the signal 84, or one of the two separated contacts, 82 and 83, in parallel, connected with the signal 55. The signal 54 may be of any desired kind, that which I contemplate using being an electric buzzer, while the signal 55 may be a gong bell. All that is required is that the signals in the warnings which they give should be distinct one from the other.

The parts of the batch timer thus far described being in the position indicated in Fig. 10, which is the normal position of the batch timer when at rest, it will be assumed that the drum has been charged and the mixing operation has begun, and that the automatic control has moved to such position that the cam 22 operates, starting the batch timer. Very shortly after it starts the circuit 84 is momentarily closed through the signal 55 by the finger 79 coming into engagement with the contact 83, and the gong 55 is sounded, indicating that the mixing operation has commenced. A short time before the mixing period terminates, say five seconds, the circuit is closed through the signal 54, by the finger 79 momentarily coming into engagement with the contact 81, and this signal sounds, giving warning that the mixing operation is nearly completed, and that the operator has a few seconds in which to take his place at the manual control levers 4 and 9. Shortly thereafter the circuit through the signal 55 is again closed by the finger coming into engagement with the contact 82, after which the operator may shift his control levers 4 and 9, to discharge the mixed concrete and again start the automatic control mechanism on another cycle of operations, causing the gong to sound a second time, and indicating that the mixing operation has been completed, that is, has been carried on for the minimum length of time that may be prescribed for the mixing operation in the particular machine with which the timer is being used. Directly after the finger has passed the contact 82 the clock mechanism comes to rest with the parts in position represented in Fig. 10.

It sometimes happens that the operator of a concrete mixing apparatus shifts the control lever to cause the chute C to be moved into position to discharge before the batch has been mixed the prescribed length of time. This sometimes takes place through fraudulent intent to hasten the manipulation of the apparatus and results in delivering the material in an incompletely mixed condition; or it may happen through the over anxiety of the attendant to secure from the machine the greatest possible output, leading him to anticipate the signal of the timer which shows completion of the proper mixing operation. The delivery of incompletely mixed material from the drum, whether from fraudulent motives or otherwise, causes a poor product to be produced and delivered, and is liable to subject the one using the machine to fine or penalty for not delivering concrete according to the specifications under which the apparatus is supposed to be operating.

It is, therefore, one of the objects of my invention to provide automatic means which will tend to prevent such improper operation of the apparatus as has been suggested. As represented in Fig. 10 I have shown an arrangement by which, should the discharge chute be moved to position to discharge material from the mixing drum before the completion of the full mixing period, the whole apparatus will be automatically stopped, as by cutting out the ignition, in case it is being run by an internal combustion engine.

Referring to the last said view 86 designates the magneto of the ignition system of the motor which drives the entire mixing apparatus. This is in a circuit 87 that includes a contact 90 in proximity to the batch timer 38, a switch or circuit closer 91 adapted to make engagement with the contact 90, a conductor uniting the switch 91 with another contact 93 in proximity to the power operated mechanism for controlling the movements of the discharge chute, and a circuit closer 94 movable with the shaft 56 of the discharge chute operating mechanism and adapted to make engagement with the contact 93. There are suitable ground connections at 88 and 89 so that when the circuit described is closed at the contacts 90 and 93 the magneto 86 will be short circuited or otherwise rendered ineffective so as to kill the engine and stop the entire apparatus. The cam 80 upon the shaft 78 of the clock mechanism of the batch timer is arranged to act upon a push rod 95 and open the circuit 87 at the contact 90 whenever the batch timer comes to rest in the position indicated in Fig. 10.

The relations of the contact 93 and the circuit closer 94 are such that whenever the discharge chute is in non-delivery position the circuit 87 is opened at the discharge chute operating mechanism, but whenever the discharge chute is shifted so that it will deliver the circuit at this point is closed. From this description it will be seen that as soon as the batch timer is started the circuit 87 is automatically closed at 90 and remains closed until the batch timer again comes to rest, that is, during the entire mixing operation. It is understood that the delivery chute should not be moved to discharging position while the mixing in the revolving drum is taking place. Should, however, the chute controlling mechanism be moved to return the chute to position to deliver, the circuit 87 is automatically closed at 93, and the circuit being also now closed at 90 it is completed and may be utilized to short circuit or otherwise render the magneto ineffective. But so long as the discharge chute remains in the non-delivery position, that is, its correct position during the mixing operation, the circuit is broken at the discharge chute contact and the magneto functions and the motor drives the apparatus. When the required time for mixing operation has elapsed and the batch timer is normalized the circuit at that point is opened and, so far as any action on the magneto is concerned, it is immaterial whether the circuit at contact 93 is left open or is closed.

The mechanism which I have just described and which is diagrammatically illustrated in Fig. 10, is typical and may be varied within wide limits, without departing from the principle of my invention, which principle contemplates an automatic operation that will at once call attention to the fact that an attempt has been made to discharge the contents of the drum before such contents are mixed the proper length of time, but which is entirely inactive so long as the apparatus is being controlled in the manner for which it is designed or adjusted.

The operation of the mechanism which has been described is as follows: It will be assumed that the drum A contains a charge of material that has been properly mixed and is ready for delivery. The operator shifts the hand lever 4, to the left, and starts the mechanism within the casing D that operates the delivery chute, and the latter, by a half revolution of the shaft 56, is shifted from its non-delivery to its delivery position. The shifting of this lever, through the connections 7, 6 and 8, lifts the lever 27 from the cam 18 of the automatic centralized control mechanism, where it is maintained, by the projection 76 riding upon the periphery of the collar 69. As the shaft 56 turns, the eccentric pivot 57, for the lever 6, moves toward the left, gradually moving the free end of the lever 27 toward the cam 18, into working engagement with which it finally comes when the projection 76 of the clutch shifting lever drops into one of the recesses 70, under the influence of the spring 64, and this takes place when the discharge chute has been fully moved to delivery position. As has already been explained this engagement of the lever 27 with the concentric portion of its operating cam continues, under proper working conditions, until the projection of such cam acts on the lever 27 to shift it and the clutch 73, causing the discharge chute to be put into connection with the driving shaft in such manner that it is moved from delivery back to non-delivery position, where it comes to rest. It has also been explained that there is no interference with the free movement of the hand lever to shift the clutch 73 by reason of the connection between such clutch and the automatic power control mechanism, which has just been referred to. It therefore follows that the operation of the hand lever 4 to shift the clutch and put the discharge chute into driving connection with its power shaft may take place at any time after the parts of the chute-driving mechanism have come to rest after the shaft 56 has made a half revolution. But should such hand lever be prematurely moved, that is, moved before the full time allowed by the automatic control mechanism for delivery of the batch of mixed concrete has elapsed, timely warning of such improper operation will be given and an effective stopping of further movements of the apparatus takes place when mechanism such as illustrated in Fig. 10 and hereinbefore described is employed.

As soon as the lever 4 has been shifted to start the delivery movement of the discharge chute, and preferably simultaneously therewith, the hand lever 9 is moved toward the left, putting the automatic power control mechanism into driving engagement with the shaft 2', see Figs. 5 and 6. The shaft 12 of this mechanism and the parts carried thereby make a complete revolution, turning in the direction of the arrows, and the gear ratios of the driving mechanism are such that the revolution is made in thirty seconds, the drum A being driven at proper normal speed. The parts, starting from the positions indicated in these views, operate to perform the several functions indicated in the diagram, Fig. 4.

Figure 7:
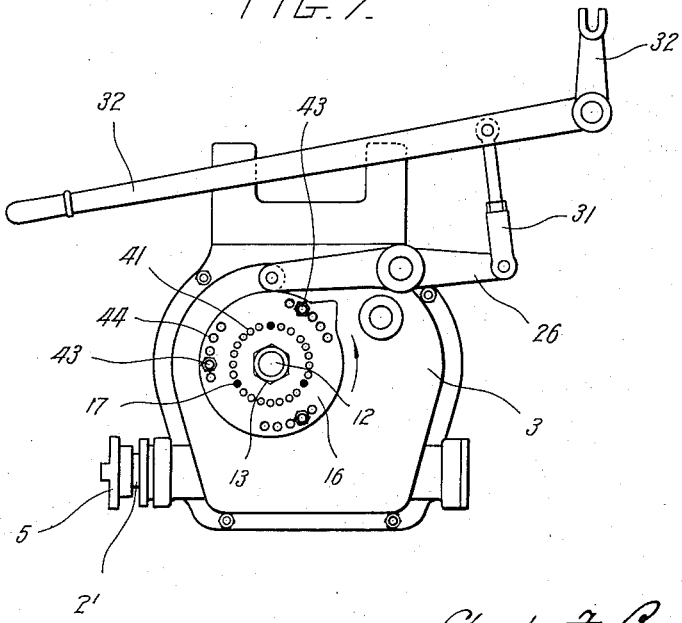
Fig. 7 is a face view of the cam that controls the operation of the clutch for the winding drum of the loading skip and parts immediately associated therewith.

The first of the several cams to operate is 16, see Fig. 7. It acts, through the lever 26 and linkage 31 and 32, to shift the clutch for the mechanism that lifts the skip or power loader B. As has been explained, the automatic control of the operation of the power loader does not interfere with the manual control thereof through the hand lever 32. The lifting of the skip requires approximately ten seconds. Simultaneously with the elevation of the skip, and before the material therein begins to slide into the drum, the discharge through the chute C takes place. The skip begins to spill its load into the drum before it reaches its highest position, and at the moment this begins the cams 18, Fig. 6, and 24, Fig. 8, come into operation, preferably simultaneously.

The cam 18 acts on the lever 27 and through the linkage that has been described operates to shift the lever 4 and clutch 73, connecting the discharge chute with its power shaft 2, causing it to be automatically shifted from delivery to non-delivery position. The cam 24 acts on the lever 28 and through linkage 33 and valve shifting lever 34 operates to open the water valves, the raised portion of the cam being of sufficient length to hold the water valves open the proper length of time, say for nine seconds, as would be the case in a mechanism constructed and arranged to operate as that being described. The water may flow into the drum during the entire time the valves are held open by the cam 18, or preferably for a shorter time through the use of a siphon discharge, but that feature of operation may be varied within the purview of my invention, the desirable feature being that the water valves shall be kept open a sufficient length of time. When the cam 24 passes the lever 28 the valves are closed through the action of the spring 40.

The last cam to operate is 22, and this is preferably so angularly disposed upon the shaft 12 that it commences to act upon its lever 24 at about the instant the cam 24 ceases to act and the water valves are closed. The cam 22 and the parts it controls are illustrated in detail in Fig. 9. The shifting of the lever 29 by the cam 22 operates to release the brake 37 that holds the skip in its elevated discharging position and which automatically came into operation when the skip reached its high point. The operation of the parts that automatically release the brake and yet permit it to be controlled by the operator through the hand lever 46 so that the skip shall descend under proper manual control, have all been described, and need not here be repeated. The movement of the lever 29 also sets the batch timer 38 into operation through linkage 30.

The batch timer as has been described is driven by suitable clock mechanism and is arranged to move for a determined period of time, say sixty seconds. This is the minimum length of time, in the machine being described, required to properly mix a batch of concrete. The starting of the timer causes the shaft 78 to turn, in the direction of the arrow, and at practically the instant it begins to move two operations take place, namely, the circuit 87 controlling the magneto 86 is closed at 90, and the circuit including the gong bell 55 is closed at 83, causing such bell to sound, indicating that the mixing operation has begun. As the shaft is about to complete its revolution, say five seconds before such completion, the circuit including the warning signal 54, is closed at 81, and such signal gives notice that the mixing operation is nearly completed, so that the operator may take his place and be ready to shift the lever 4 to start the movement of the discharge chute into delivery position the moment the period of the mixing expires, which is indicated by a second sounding of the gong bell 55, as the circuit is closed at the point 82. The finger 79 passes sufficiently beyond the circuit closing contact 82 to be free of the latter, when the batch timer comes to normal position, as indicated in Fig. 10, and ceases to move. As the shaft 70 completes its movement the cam 80 carried thereby acts on the rod 95 which opens the circuit 87 at the point 90.

As has been already stated the various cams upon the shaft 12 are separately supported thereon and are independently angularly adjustable about the same. The double adjustment for these cams has been hereinbefore described, and this enables the automatic control mechanism, through one set of adjusting devices, to be set to suit the machines of a particular manufacturer in the plant where the control mechanism is assembled, while the other set of adjusting devices permit minor adjustments to be made on the job such as may become necessary through conditions met with in operating a particular machine.

I have described a contol device provided with four cams and co-operating parts arranged to be moved thereby controlling the various movements of a concrete mixing machine. It is evident, however, that the number of cams could be either greater or less than that shown in the drawings should the character of the machine and the parts to be operated and controlled by the cams be different from that illustrated in the drawings. It is also evident that the control device described might be used in connection with other apparatus than one for mixing concrete, although it has been devised with especial reference to application to a concrete mixing apparatus of well known construction. I therefore wish it to be understood that this specification and the accompanying drawings are descriptive of my invention, rather than the particular application thereof, and that when I herein specifically refer to a concrete mixing apparatus, such designation is intended to have a broad or generic significance, inlcuding not only a specific machine such as shown in the drawings, but apparatus that has features which are the mechanical equivalents of those illustrated.

What I claim is:

1. In a mixing apparatus, the combination with a power driven mixing vessel, means by which the vessel is charged with ingredients to be mixed, and means by which the mixed material is delivered from the mixer, of an automatically operated control means by which the operations of various parts of the mixing apparatus, including the charging and the discharging means, are controlled in proper sequence and duration, and means under manual control for setting into operation the said automatic control means.

2. In a mixing apparatus, the combination with a power driven rotary mixing drum, means by which the drum is charged with ingredients to be mixed, and means by which the mixed material is delivered, of an automatically operated control means by which the operations of various parts of the mixing apparatus, including the charging and the discharging means, are controlled in proper sequence and duration, means for driving the automatic control means at a speed determined by the speed of the mixing drum, and means under manual control for setting into operation the said automatic control means.

3. The combination stated in claim 1, including also manual devices, independent of the said automatic control and by which certain of the parts of the mixing apparatus, controlled by the automatic means, may be caused to operate at the will of the operator.

4. The combination stated in claim 1, including manually operated means for controlling the movements of the means by which the material is delivered from the mixer, operable independently of the automatic means.

5. The combination stated in claim 1, including manually operated means by which the starting of the charging means may be controlled at will.

6. The combination stated in claim 1, including also a timer that indicates the proper length of time the mixing should continue, the starting of the timer being governed by the said automatic control.

7. In a concrete mixing apparatus, the combination with a power driven rotary mixing drum, means by which the various ingredients that enter into the concrete are delivered thereto, and means by which the mixed concrete may be discharged, of an automatically operating device by which the several movements incident to charging the ingredients into the mixing drum are controlled in proper sequence and duration, connections between the said control device and said charging means, and a manual control independent of the automatic control by which the discharge device is set to discharge position at the will of the operator.

8. The combination stated in claim 7, including connections between the automatic control and the discharge device by which the latter is automatically caused to be moved to non-discharging position prior to the mixing operations.

9. The combination stated in claim 7, including with the charging devices also a timer that indicates the proper length of time the mixing should continue, the starting of the timer being governed from the said automatic control.

10. In a concrete mixing apparatus, the combination with a power driven rotary mixing drum, a discharge device therefor, a charging device therefor, manually operated devices by which the movements of the said discharging and charging devices may be controlled, of automatically operating means by which the several parts of the mixing apparatus that come into operation in the mixing of a batch of concrete are controlled in proper sequence, and connections between the control device and the parts which it controls, the connections being such that the said manual control means may be operated at will and independently of the automatic control.

11. In a concrete mixing apparatus, the combination of a power driven rotary mixing drum, a power driven discharge device therefor and means by which the starting of the discharge device is controlled at the will of the operator, of a device for automatically controlling the various operations of the mixing apparatus, connections through which the said control device is driven at a speed corresponding with that of the mixing drum, including a clutch, and manually controlled means for operating the said clutch.

12. In a concrete mixing apparatus, the combination with a power driven rotary mixing drum, a power driven discharge device therefor, means by which the connection of the discharge device with its source of power may be manually controlled, a charging skip and power connections for raising it to charge the aggregate into the mixing drum, of an automatic device arranged to control the connection of the loading skip with its source of power to elevate it, connections between the control device and a source of power, and manually controlled means for putting the control device into connection with the power.

13. The combination stated in claim 12, including adjustable means by which the elevation of the skip is controlled, permitting a time variable at the will of the operator to elapse between the starting of the control device and the elevation of the loading skip.

14. The combination stated in claim 12, including as a part of the control device, means for automatically controlling the time for the descent of the loading skip.

15. The combination stated in claim 12, including as a part of the control device means for automatically controlling the time for the descent of the loading skip, and adjustable means for the parts that determine both the starting of the upward movement of the skip and for the lowering of the same.

16. In a concrete mixing apparatus, the combination with a power driven rotary mixing drum, a power driven discharge device therefor, means by which the operation of the discharge device is manually controlled at the will of the operator, a charging skip and power connections for raising the skip to discharge into the mixing drum, and means for delivering water into the drum, of a control device having driving connection with a source of power to operate it, and means for starting the control device, the control device being provided with means that start the upward movement of the loading skip and with means for controlling the water supply.

17. The combination stated in claim 16, in which the means for putting the control device in connection with the power are independently manually controlled.

18. The combination stated in claim 16, including means for separately adjusting the control device for starting the skip and for operating the water valve.

19. In a concrete mixing apparatus, the combination with a power driven rotary mixing drum, a discharge chute therefor, arranged to occupy either a non-delivery position or a delivery position, and power operated means for moving the chute from one of the said positions to the other, including a manually operated clutch, of an automatic control device having power connections, including a manually controlled clutch, and means operated from the control device for automatically shifting the clutch of the discharge chute to position to cause the chute to be moved to its non-delivery position.

20. The combination stated in claim 19, having the automatic control means that operate the clutch of the power discharge chute adjustable, whereby the length of time that the discharge chute is in position to deliver may be varied at will.

21. In a power driven concrete mixing apparatus, an automatic device for controlling the movements of the parts of such apparatus, comprising a shaft, gearing, including a clutch, uniting the shaft to a power driven part of the apparatus, and a series of cams carried by the shaft arranged to control in desired sequence the operation of the several parts of the apparatus.

22. The combination stated in claim 21, including means by which the cams may be adjusted relative to each other, whereby the timing of the movements controlled may be varied at will.

23. In a power driven concrete mixing apparatus, the combination with a rotary drum, associated parts co-operating to effect the production of mixed concrete, and connections through which the said co-operating parts are operated, of an automatically operating control device, comprising a shaft, gearing including a clutch through which the shaft may be intermittently rotated, manually controlled means by which the clutch of the gearing is operated, a series of cams carried by the operating shaft, and independent trains of connections between the cams and the connections through which the aforesaid co-operating parts are operated.

24. A control device for concrete mixing and similar machines, comprising a power shaft, a clutch thereupon, a cam shaft, gearing between these shafts, a casing protecting the gearing and exposed cams carried by the cam shaft, the cams being located in different planes and occupying different positions angularly about the axis of the shaft.

25. The combination stated in claim 24, in which the cams are supported at the opposite sides of the casing upon the exposed ends of the cam shaft, and are independently angularly adjustable about the axis of the shaft.

26. A control device for concrete mixing and similar machines, comprising a shaft, a member carried thereby having a driving pin, and a cam plate provided with a set of concentrically disposed holes into one or another of which the driving pin may enter, thereby causing the cam plate to turn with the shaft and permitting angular adjustment of the cam upon the shaft.

27. A control device for concrete mixing and similar machines comprising a shaft, a member carried thereby having a driving pin, a cam plate formed with a concentric series of holes into one or another of which the driving pin may enter to cause the cam plate to turn with the shaft, and also permitting angular adjustment of the cam plate relative to the shaft, a second cam plate, and adjustable means for uniting the cam plates so they turn together, but permitting angular adjustment of one relative to the other.

28. A control device for concrete mixing and similar machines, comprising a shaft, a plate carried thereby, provided with a plurality of driving pins, a cam plate formed with a concentric series of holes into which the driving pins may enter, this arrangement permitting angular adjustment of the cam plate relative to the shaft, a second cam plate disposed on the opposite side of the drive plate from the first cam, spacing means between the two cam plates to hold them apart, and means for uniting the two cam plates and also permitting angular adjustment of one relative to the other.

29. The combination with a delivery chute, power driven mechanism for moving the chute alternately from non-discharging to discharging position, and vice versa, and manually controlled means for starting the power driven mechanism, of an automatic control device arranged to start the mechanism that drives the chute to move it from discharge to non-discharging position, and means to break the connection between the control mechanism and the drive for the chute when the latter is in its non-discharging position, but leaving the chute free be manually controlled.

30. The combination with a deliver chute, power driven mechanism for movir the chute alternately from non-dischargir to discharging position, and vice versa, ma ual control means for starting the pow driven mechanism, of an automatic contr device, connections between the control d vice and the means for starting the pow driven mechanism for the delivery chute, tl said connections being operative when tl discharge chute is in discharging positic and non-operative when the chute is in no discharging position.

31. The combination with a delivery chut power driven mechanism for moving tl chute alternately from non-discharging discharging position, and vice versa, a ma ually operated lever through which the star ing of the power driven mechanism is co trolled, of an automatic control device cor prising a shaft and an operating cam ther on, linkage between the cam and the ma ual control lever, through which the man ally operated lever is shifted by the cam, i cluding a lever, and means operated by tl movements of the discharge chute for shif ing the fulcrum of the last said lever, wher by when the discharge chute is in dischar, ing position the connection with the aut matic control is maintained, and when non-discharging position such connection interrupted.

32. In a concrete mixing apparatus, tl combination with the mixing drum and loading skip, of means for raising the ski to position to discharge into the drum, brake for holding the skip in elevated pos tion, an automatic control device arrange to, in proper sequence and time, start tl means for raising the skip, and to releas the brake, and a manually controlled devi by which the brake is controlled after bein released, permitting the skip to descend u der manual control.

33. In a concrete mixing machine, tl combination with the mixing drum, of a automatic control device, manual means fc setting the control device into operation, batch timer, and connections between tl automatic control device and the batch tim by which the latter is set into operation.

34. The combination stated in claim 33, i which the batch timer is controlled by cloc mechanism.

35. In a concrete mixing apparatus, th combination with a mixing drum, powe driven discharge devices, a batch timer ar ranged to be set into operation when th mixing commences within the drum, and a electric control device including a circu controlled both at the discharge devices an at the batch timer and arranged to indicat should the discharge devices be moved to discharging position before the full time for mixing as determined by the batch timer has elapsed.

36. In a concrete mixing apparatus, the combination with a mixing drum, power driven discharge devices, a batch timer arranged to be set into operation when the mixing commences within the drum, and an electric control device including an electric circuit arranged to be opened and closed both at the batch timer and at the discharging devices, means for opening the circuit at the batch timer when the latter comes to its inactive position, and means for closing the circuit at the discharge devices except when the discharge devices are in non-discharging position, whereby should attempt be made to move the discharge devices to delivery position after the batch timer has started and before it completes its operation, warning will be given.

37. The combination stated in claim 38, in which the electric circuit named includes means for controlling the power devices for driving the mixing apparatus.

38. The combination stated in claim 39, in which the electric circuit named includes means for controlling the power devices for driving the mixing apparatus.

39. In a concrete mixer the combination with a mixing drum, a power driven loader therefor, a power driven discharge chute therefor and manually operated means by which the discharge chute is connected with its power source for moving it to its discharging position, of an automatically operating mechanism arranged to control in desired sequence the movements of the loader, and also the movements of the discharge chute to nondelivery position, and manually controlled means for setting into operation the said automatic control mechanism.

CHARLES F. BALL.

CERTIFICATE OF CORRECTION.

Patent No. 1,608,831.    Granted November 30, 1926, to

CHARLES F. BALL.

It is hereby certified that error appears in the printed specification of the above numbered patent requiring correction as follows: Page 11, line 23, claim 37, for the numeral "38" read "35", and line 27, claim 38, for numeral "39" read "36"; and that the said Letters Patent should be read with these corrections therein that the same may conform to the record of the case in the Patent Office.

Signed and sealed this 15th day of May, A. D. 1928.

M. J. Moore,
Acting Commissioner of Patents.

(Seal)